United States Patent
Huss et al.

(10) Patent No.: US 6,746,637 B1
(45) Date of Patent: Jun. 8, 2004

(54) PROCESS FOR MAKING CHEMICAL RESISTANT PUMP DIAPHRAGM

(75) Inventors: Howard Huss, North Huntingdon Township, Westmoreland County, PA (US); Eldon Eady, Hempfield, PA (US); James Varney, North Huntingdon Township, Westmoreland County, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 484 days.

(21) Appl. No.: 09/439,457

(22) Filed: Nov. 15, 1999

(51) Int. Cl.$^7$ ............................................... B29C 45/16
(52) U.S. Cl. ....................................... 264/135; 264/250
(58) Field of Search ................................. 264/250, 255, 264/135; 92/103 R, 103 SD, 98 R, 96

(56) References Cited

U.S. PATENT DOCUMENTS

| | | |
|---|---|---|
| 3,071,118 A | 1/1963 | Wilden |
| 4,147,824 A * | 4/1979 | Dettmann et al. ............ 428/65 |
| 4,247,264 A | 1/1981 | Wilden |
| D275,858 S | 10/1984 | Wilden |
| 4,657,973 A | 4/1987 | Endo et al. |
| 4,707,506 A | 11/1987 | Markezich |
| D294,946 S | 3/1988 | Wilden |
| D294,947 S | 3/1988 | Wilden |
| 5,169,296 A | 12/1992 | Wilden |
| 5,213,485 A | 5/1993 | Wilden |
| 5,217,797 A * | 6/1993 | Knoz et al. ................. 428/246 |
| 5,349,896 A * | 9/1994 | Delaney, III et al. ....... 92/98 R |
| 5,391,060 A | 2/1995 | Kozumplik, Jr. et al. |
| 5,615,597 A * | 4/1997 | Schoenmeyer .......... 92/103 SD |
| 5,743,169 A * | 4/1998 | Yamada ...................... 92/100 |
| 5,750,580 A | 5/1998 | Mayer et al. |
| 5,816,133 A | 10/1998 | Schoenmeyer |
| 6,138,550 A * | 10/2000 | Fingar et al. ............. 92/103 R |

* cited by examiner

Primary Examiner—Edmund H. Lee
(74) Attorney, Agent, or Firm—Buchanan Ingersoll, P.C.

(57) ABSTRACT

A method for making an injection molded multilayer polymer pump diaphragm having one side resistant to chemicals. The method can include injecting molten polymer material of a first type having chemical resistance properties into a first pump diaphragm mold cavity to produce a first pump diaphragm layer; curing the first pump diaphragm layer; applying an adhesive to one side of the first pump diaphragm layer; placing the first pump diaphragm layer in a second pump diaphragm mold cavity sized to receive an amount of a second type of polymer material against the adhesive painted side of the first pump diaphragm layer; injecting molten polymer material of the second type into the second pump diaphragm mold cavity into contact with the adhesive to produce a second pump diaphragm layer adhered to first pump diaphragm layer; and curing the second pump diaphragm layer such that said first and second pump diaphragm layers adhere together to form a pump diaphragm having one side which is resistant to chemicals.

1 Claim, 5 Drawing Sheets

PROCESS FOR MAKING CHEMICAL RESISTANT PUMP DIAPHRAGM

BACKGROUND

This invention relates generally to a process for making a chemical resistant pump diaphragm, and more particularly, to a process for making a two layer bonded thermoplastic elastomer pump diaphragm. Air driven diaphragm pumps are well known in the art. There are many types of pump apparatus which employ compressed air through an actuator valve to drive double diaphragms. Some examples of such devices can be found described in U.S. Pat. Nos. 4,247,264, D294,946, D294,947, and D275,858, all issued to James K. Wilden. An actuator valve used with such air driven diaphragm pumps is disclosed in U.S. Pat. No. 3,071,118, also issued to James K. Wilden.

Common to the aforementioned patents describing air driven diaphragm pumps is the presence of an air chamber housing having a center section and concave discs facing outwardly from the center section, liquid chamber housings, an inlet manifold and an outlet manifold. Check valves are also positioned in both the inlet passageways and the outlet passageways. The check valve chambers are defined with ribs or other restrictions typically cast into the components to maintain the check valves in position. Seats are provided which may be inserts or integral with the components depending on material and fabrication techniques. Diaphragms located between the air chambers and water chambers reciprocate back and forth under the influence of air pressure directed alternately to one side or the other of the pump. This action in combination with the check valves provides for the pumping of a wide variety of materials.

Typically, the diaphragms can be formed from rubber, which can also be reinforced by fabric or other fillers. However, because certain application require the pumping of materials which can contain chemicals which can be corrosive to the rubber compounds, it can be necessary to either coat the rubber diaphragms with a protective material or form the diaphragm from a substance which is resistant to chemicals. One manner of providing protection from chemicals which is well known in the art is to attach a Teflon™ shield to a rubber diaphragm. The Teflon™ shield can also provide protection against high temperatures. However, Teflon™ shields can be relatively expensive. It is also known to form diaphragms from other materials besides rubber. Such materials can have high tensile strength, thermal stability, elasticity and fatigue resistance. Some examples are polyester based materials such as Hytrel™, Santoprene™ and Sarlink™. These polymers can be utilized to form diaphragms more simply, such as by injection molding, and also less expensively than fabric reinforced rubber diaphragms. A Hytrel™ diaphragm is described in an English language abstract of French patent No. FR 2422086. However, such polymer diaphragms still lack chemical resistance and would require a Teflon™ shield similarly to rubber diaphragms if they are to be exposed to certain chemicals.

It is also known to bond together two types of materials having different degrees of hardness, as described in U.S. Pat. No. 5,816,133 to Schoenmeyer. However, in Schoenmeyer, the two types of material are not actually different materials. They both have the same base polymer, and the only difference is the percentage of rubber filler in each. Hence, that patent describes that the first layer of material is inject and permitted to harden prior to the second layer being injected onto the first layer. It is stated that when the second layer is injected onto the first layer that the two layers "weld" together because the base materials of each layer has the same melt temperature. Regarding the composition of the diaphragm in that patent, it is believed to be Santoprene™. Basically one type of the Santoprene™ material is harder, i.e. less rubber than the second type of Santoprene™ material being used. Thus, there is the identical base polymer, except one has a lower rubber content than the other, which means that material is a little softer than the other. In any case, both layers contain the same base polymer which is what permits the welding of the interface of the two layers. Additionally, both layers contain rubber, which means that neither layer can provide chemical protection for the diaphragm. If there is any rubber content at all, the chemical resistance of the diaphragm is only as good as the chemical resistance of the rubber content, which is typically insufficient. Regarding the application for the type of diaphragm in Schoenmeyer, the hard layer can be provided to work against the fluid pressure, whereas the softer layer can be for flexibility and to help support the hard layer. In contrast to a air driven double diaphragm pump wherein the diaphragms actually flex back and forth, the diaphragm in the Schoenmeyer patent does not flex. Rather, it is subjected to a rolling type of application. Typically, in pumps which use this type of diaphragm, such as bilge pumps for boating applications, there is a wobble plate positioned against the top portion of the diaphragm. In operation, this wobble plate is "wobbling," i.e. lifting one, lowering a second, and lifting the other third, as it pumps. There are typically three chambers pumping water out. The diaphragm in the Schoenmeyer patent was developed in order to withstand pressure, e.g. hydraulic pressure, not for chemical resistance. Because of the rubber content, if the Schoenmeyer diaphragm were to be used in a chemical environment, a Teflon™ shield would still be needed. However, in regard to chemical resistance, there can be alternative materials to Teflon™ which can provide adequate chemical resistance for diaphragms. For example, a material called Arnitel™ is also known to provide resistance to chemicals similarly to Teflon™. Yet, Arnitel™ can be less resistant to high temperatures than Teflon™. Nevertheless, many applications can require chemical resistance but not involve high temperatures, and thus can be suitable for Arnitel™. Moreover, Arnitel™ can be injection molded for simplicity of production and is less expensive than Teflon™.

Accordingly, there is a need for a pump diaphragm which can be produced simply and less expensively than fabric reinforced rubber and which can be provided with chemical resistance more simply and less expensively than providing a Teflon™ shield.

SUMMARY

The invention provides a two layer flexible pump diaphragm wherein one layer is chemical resistant. One layer can be produced from a polymer, such as, for example Hytrel™, Santoprene™, or Sarlink™ which can be injection molded for ease of production and cost efficiency. Such materials can also provide high tensile strength, thermal stability, elasticity and fatigue resistance. The diaphragm can be produced by a two part injection molding and can utilize a common mold portion and two different mold portions which can mate with the common portion. The common mold portion can be used in both molding operations. The first part of the molding process can include injecting molten Arnitel™ material into a cavity having the form of the diaphragm to be produced. The Arnitel™ portion can provide the desired chemical resistance for the two part diaphragm. As many Arnitel™ portions can be molded initially as desired depending on the number of diaphragms to be produced. After curing, the Arnitel™ diaphragm portions can painted with an adhesive which can be used to bond the two parts of the diaphragms together. To create the two part diaphragm, the cooled Arnitel portion which has been painted with the adhesive can be placed back into the common mold portion which can then be mated up with the second mold portion. Molten Sarlink™ or Hytrel™ material can then be injected into the mold cavity against the Arnitel™ portion. The adhesive can be activated by the heat of the molten material and thereby bond the Sarlink™ or Hytrel™ material to the Arnitel™ to create the final two part diaphragm. Additional finishing steps, such as drilling fastener holes can be performed after the diaphragm is hardened.

Other details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION OF CERTAIN EMBODIMENTS

Figure 1:
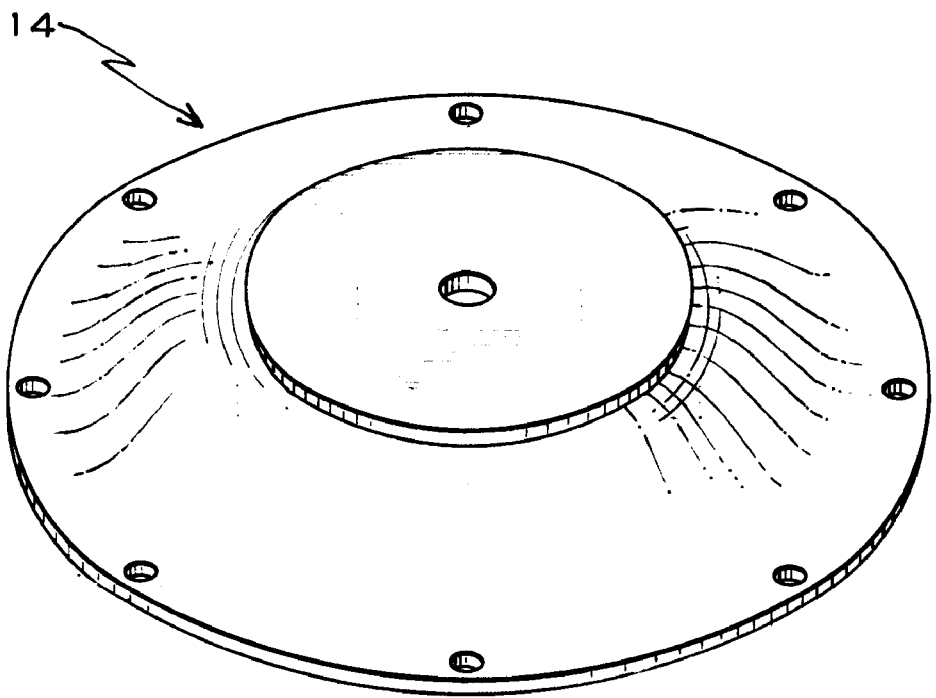
FIG. 1 is a perspective view of a prior art rubber pump diaphragm.
Figure 2:
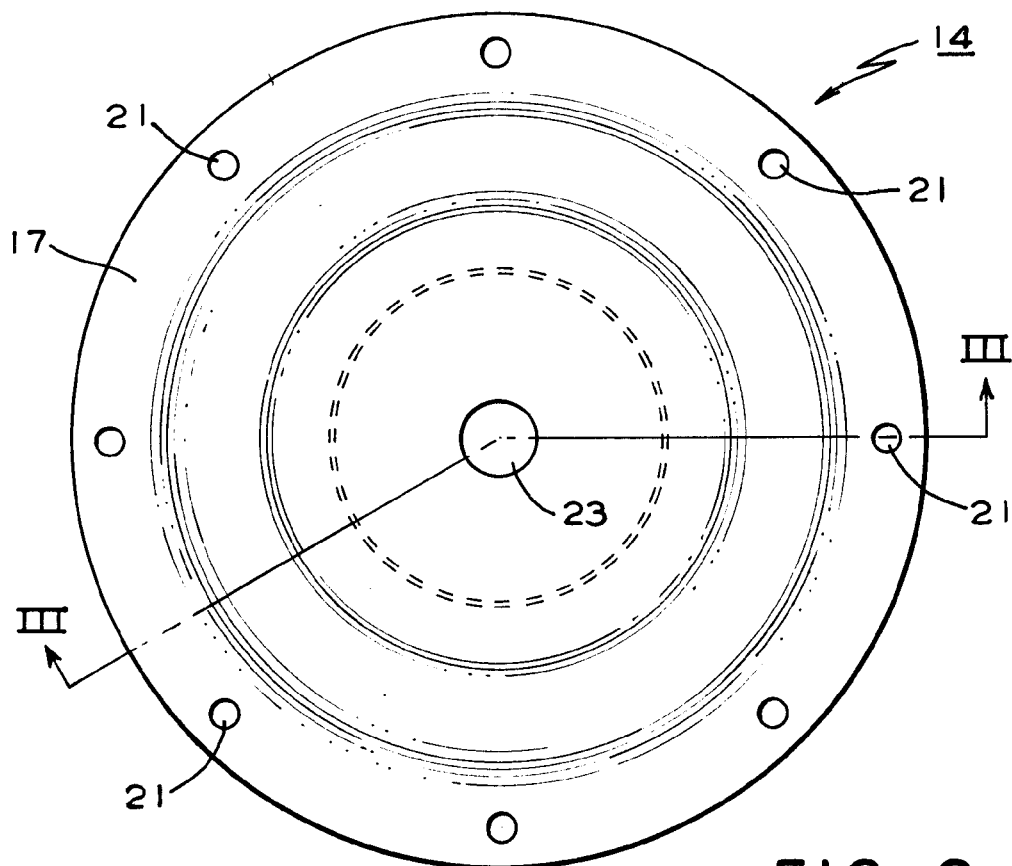
FIG. 2 is a plan view of the pump diaphragm shown in FIG. 1.
Figure 3:
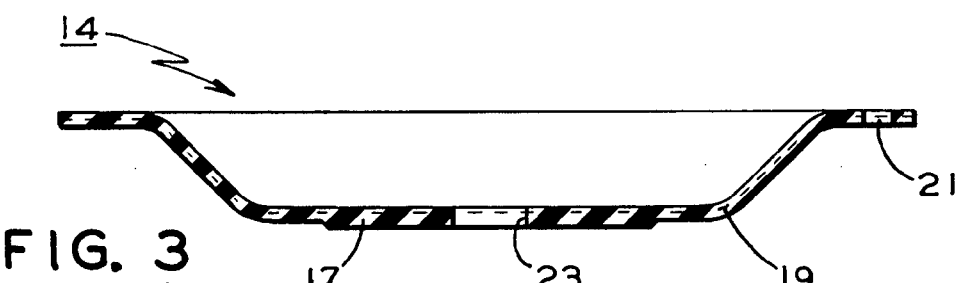
FIG. 3 is a cross sectional view of the diaphragm in FIG. 1 taken through line III—III in FIG. 2.

To aid in understanding presently preferred embodiments of the invention, it may be helpful to first describe some prior art pump diaphragms as shown in FIGS. 1 through 7. Thus, referring now to the drawing figures wherein like reference numbers refer to similar parts throughout the several views, FIGS. 1 through 3 illustrate a prior art rubber diaphragm 14 which is reinforced with a fabric material 19. The diaphragm 14 can typically be provided with a number of peripherally located fastener holes and one central fastener hole for positioning and retaining the diaphragm within the pump. As shown in the cross sectional view in FIG. 3, the diaphragm generally has a bowl shape and is formed from a relatively thin layer of rubber 17 in which can be embedded a layer of fabric 19 to provide strength to the diaphragm 14.

Figure 3A:
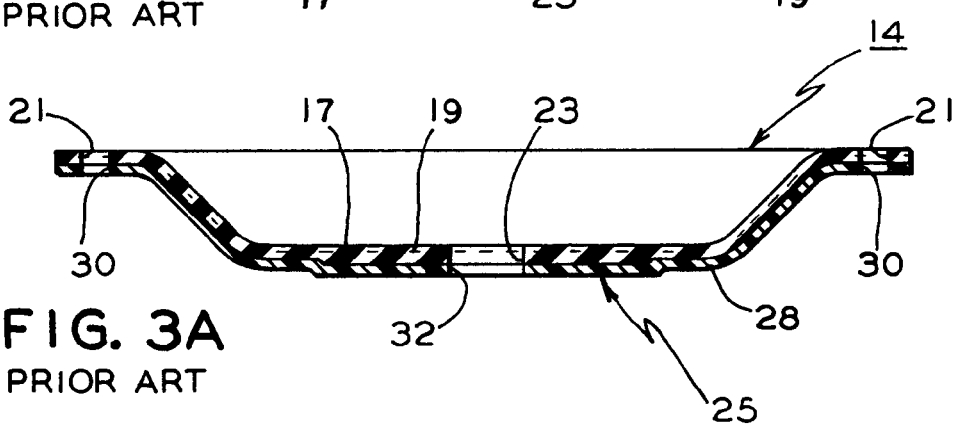
FIG. 3A is a cross sectional view of a Teflon™ shield bonded to a rubber diaphragm.

FIG. 3A illustrates one prior art manner of joining a Teflon™ shield 25 to the fabric reinforced rubber diaphragm 14. In this example, a Teflon™ shield 25 having a similar shape as the rubber diaphragm 14 can be painted with an adhesive and placed in a compression mold. Next, un-vulcanized rubber can be placed adjacent the adhesive painted side of the Teflon™ shield. Heat and pressure can be applied to simultaneously cure the rubber, activate the adhesive and bond the rubber to the Teflon™ shield, and form the rubber diaphragm 14 into the shape of the Teflon™ shield 25.

Figure 4:
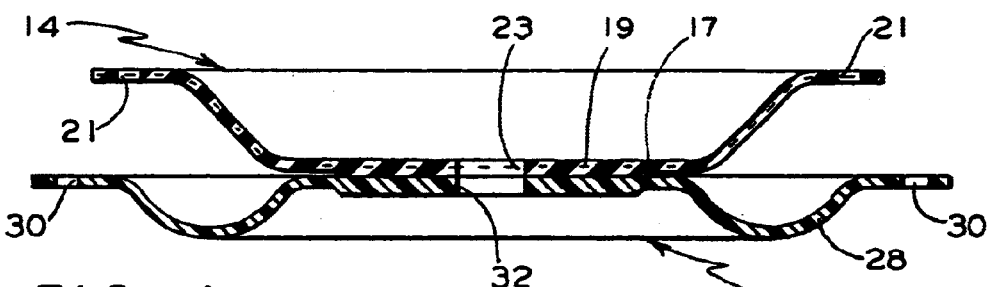
FIG. 4 is a cross sectional view of an alternative manner of bolting a rubber diaphragm to a Teflon™ shield.

FIG. 4 illustrates an alternative manner of joining a Teflon shield 26 to the rubber diaphragm 14 to provide chemical protection, primarily, and protection against high temperatures to the rubber diaphragm 14. In this example, the Teflon shield 26 and a cured rubber diaphragm 14 can simply be fastened in the pump chamber adjacent to each other via the peripheral fastener holes 30 in the Teflon™ shield 26 and the peripheral holes 21 in the rubber diaphragm 14. Because the rubber diaphragm 14 is relatively soft and flexible compared to the Teflon shield 28, when the rubber diaphragm 14 is fastened to the Teflon shield 28 and held within the pump, the rubber material 17 will be deformed by the fluid pressure into the shape of the more rigid Teflon™ shield 26. The Teflon material 28 provides also can protect the rubber diaphragm 14 from chemicals.

Figure 5:
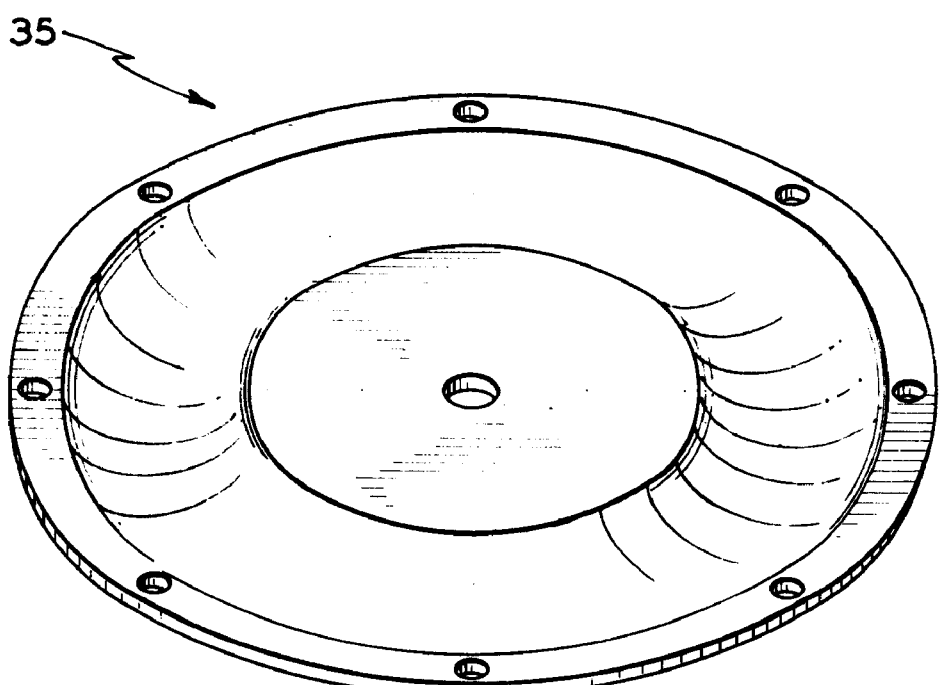
FIG. 5 is a perspective view of a prior art pump diaphragm made from a thermoplastic polymer.
Figure 6:
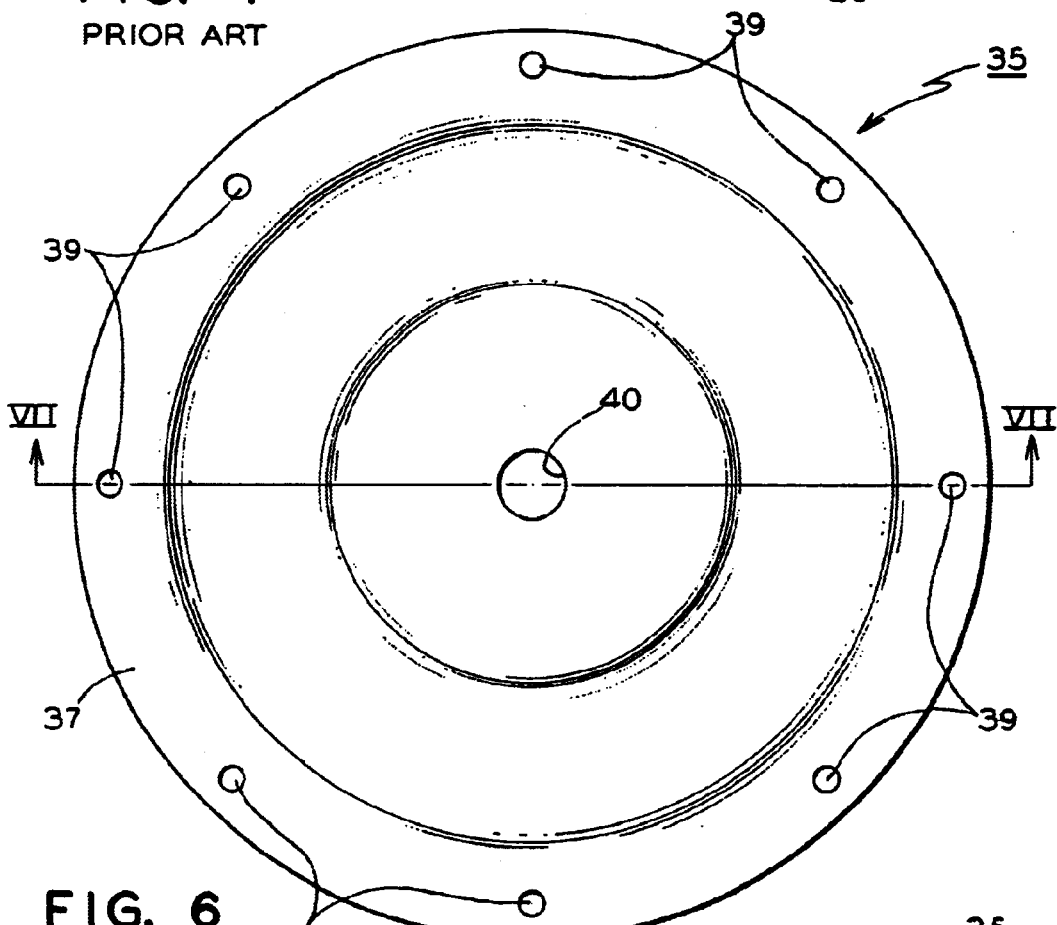
FIG. 6 is a plan view of the diaphragm shown in FIG. 5.
Figure 7:
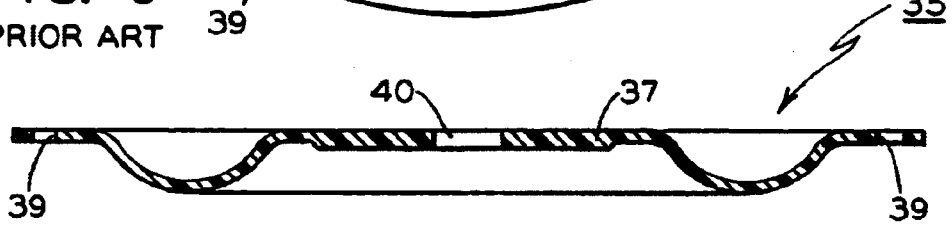
FIG. 7 is a cross sectional view of the diaphragm shown in FIG. 5 taken along line VII—VII in FIG. 6.

In FIGS. 5–7 there is shown a pump diaphragm 35 which can be injected molded from a thermoplastic elastomer 37, such as Hytrel™, Santoprene™ or Sarlink™. Hytrel™ is produced by DuPont Chemicals Co., having an address at 1007 Market Street, Wilmington, Del. 19803; Santoprene™ is produced by Advanced Elastomer Systems, having an address at 388 South Main Street, Akron, Ohio 44311-1059; and Sarlink™ is produced by DSM Engineering Plastics, having an address at Post Office Box 3333, 2267 West Mill Road, Evansville, Ind. 47732-3333. These polymer materials can be easily injection molded at a lower cost than the fiber reinforced rubber diaphragms can be produced. These polymers can also provide adequate tensile strength, thermal stability, elasticity and fatigue resistance comparable to the fabric reinforced rubber diaphragms, but at a lower cost and using a simple injection molding process. Like the rubber diaphragm 14, the polymer diaphragm 35 can be provided with peripheral fastener holes 39 and a central hole 41 for being inserted and held in a pump. However, these polymers do not provide chemical resistance and would still require a Teflon™ shield if used in a chemical environment.

Figure 7A:
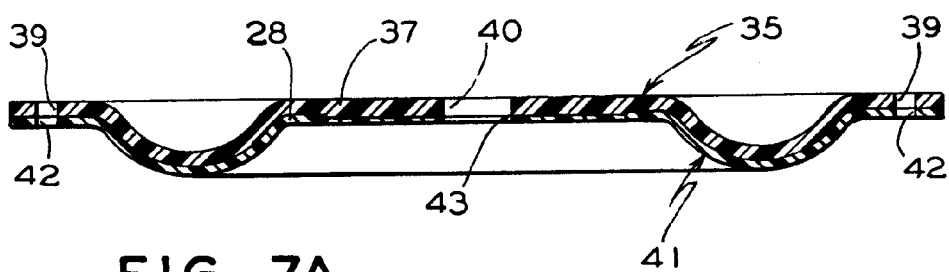
FIG. 7A is a cross sectional view of a Teflon™ shield which can be bolted to a polymer diaphragm.

Referring to FIG. 7A, there is illustrated a prior art polymer diaphragm 35 joined to a Teflon™ shield 41. The Teflon™ shield 41 can have a shape corresponding to the shape of the polymer diaphragm 35. To provide chemical protection, the Teflon™ shield 41 can simply be bolted into the pump adjacent to the polymer diaphragm 35, on the side which would be exposed to the chemical materials.

The diaphragm illustrated in FIG. 7A is simply shown as an example of a manner in which a teflon shield 41 could be bolted to a polymer diaphragm 35 in a manner similar to that shown in FIG. 4 wherein the teflon shield 26 is bolted to a rubber diaphragm 14 as known in the prior art. However, the polymer diaphragm 35 and teflon shield 41 shown in FIG. 7A has not heretofore been produced in the prior art.

Figure 8:
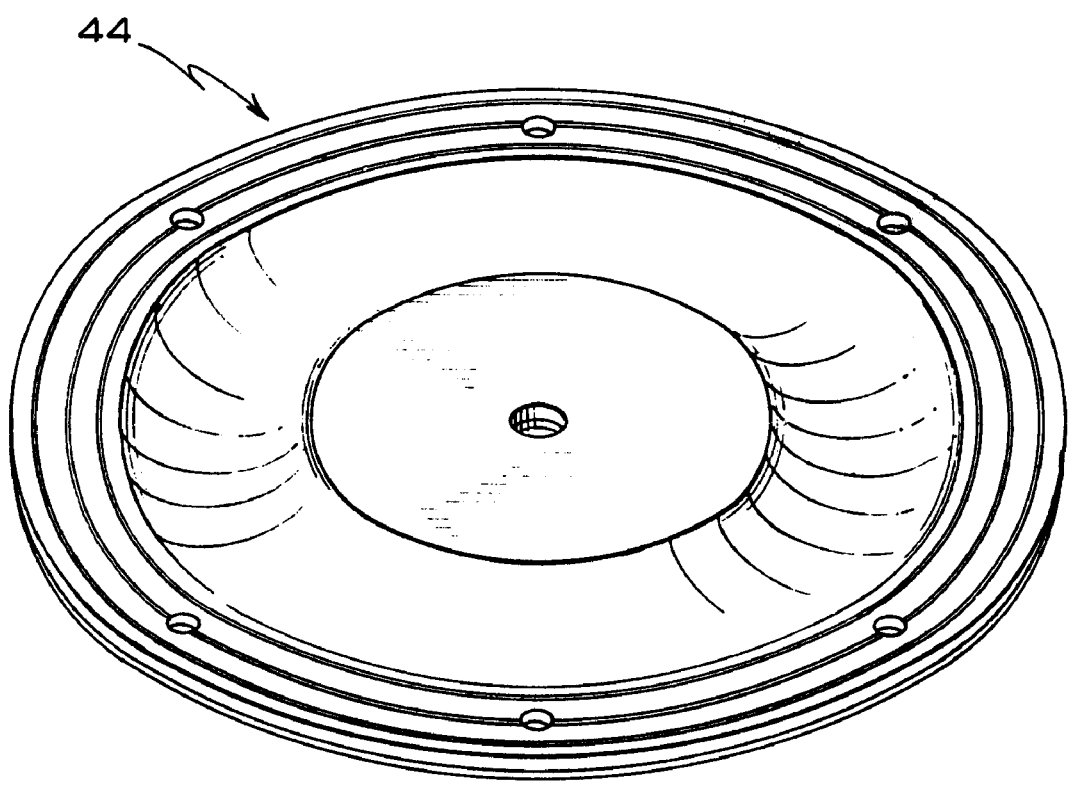
FIG. 8 is a perspective view of a presently preferred embodiment of a two layer pump diaphragm.

Referring now to FIG. 8 there is shown a presently preferred embodiment of a two layer injection molded pump diaphragm 44. One layer of the pump diaphragm 44 can be molded from a polymer material 46, which can be a material such as Hytrel,™ Santoprene,™ or Sarlink,™ and the second layer can be molded from a polymer such as Arnitel™ which can provide chemical resistance for the Sarlink™. Arnitel™ is produced by DSM Engineering Plastics, having an address at Post Office Box 3333, 2267 West Mill Road, Evansville, Ind. 47732-3333. An adhesive which is presently preferred is Chemlok™ 487A with a hardener Chemlok™ 487B, both produced by Lord Corporation Chemical Products.

Unlike the prior art process described in the Schoenmeyer patent for producing a diaphragm made from the same base polymer except having different degrees of hardness due to the rubber content of the material, the process according to the invention can employ two polymer materials which have dissimilar base materials. Schoenmeyer states that the two material become chemically welded together during the process because, having the same base material, they melt at the same temperature. In contrast, the two polymer, such as Sarlink™ and Arnitel™, do not melt at the same temperature. Arnitel™ melts somewhere around 450° whereas Sarlink™, or Santoprene™, melts somewhere around 370° or 380° F. That is why the adhesive is employed in this process. If the Sarlink™ were simply injected against the hardened Arnitel™ without the adhesive, it would not adhere. On the other hand, if the Arnitel™ were injected against the hardened Sarlink™, which has the lower melting point, the Arnitel™ would melt and displace the Sarlink™. Moreover, the both layers of polymer in Schoenmeyer are stated as having a rubber content, which makes the diaphragm susceptible to chemicals. According to the invention, the diaphragm can be produced with neither layer having any rubber content at all. Additionally, the diaphragm in Schoenmeyer does not flex. Rather, it's a rolling type of application. In contrast, the diaphragm according to the invention is used in applications where it is required to flex back and forth. The diaphragm according to the invention is designed for chemically resistance and to last as long as or longer than a conventional fabric reinforced rubber diaphragm joined to a Teflon™ shield. The Schoenmeyer diaphragm is not concerned at all with chemical resistance or flexing. Rather, the main consideration seems to be the ability to resist and respond to fluid pressure as the wobble plate operates against the diaphragm.

Figure 9:
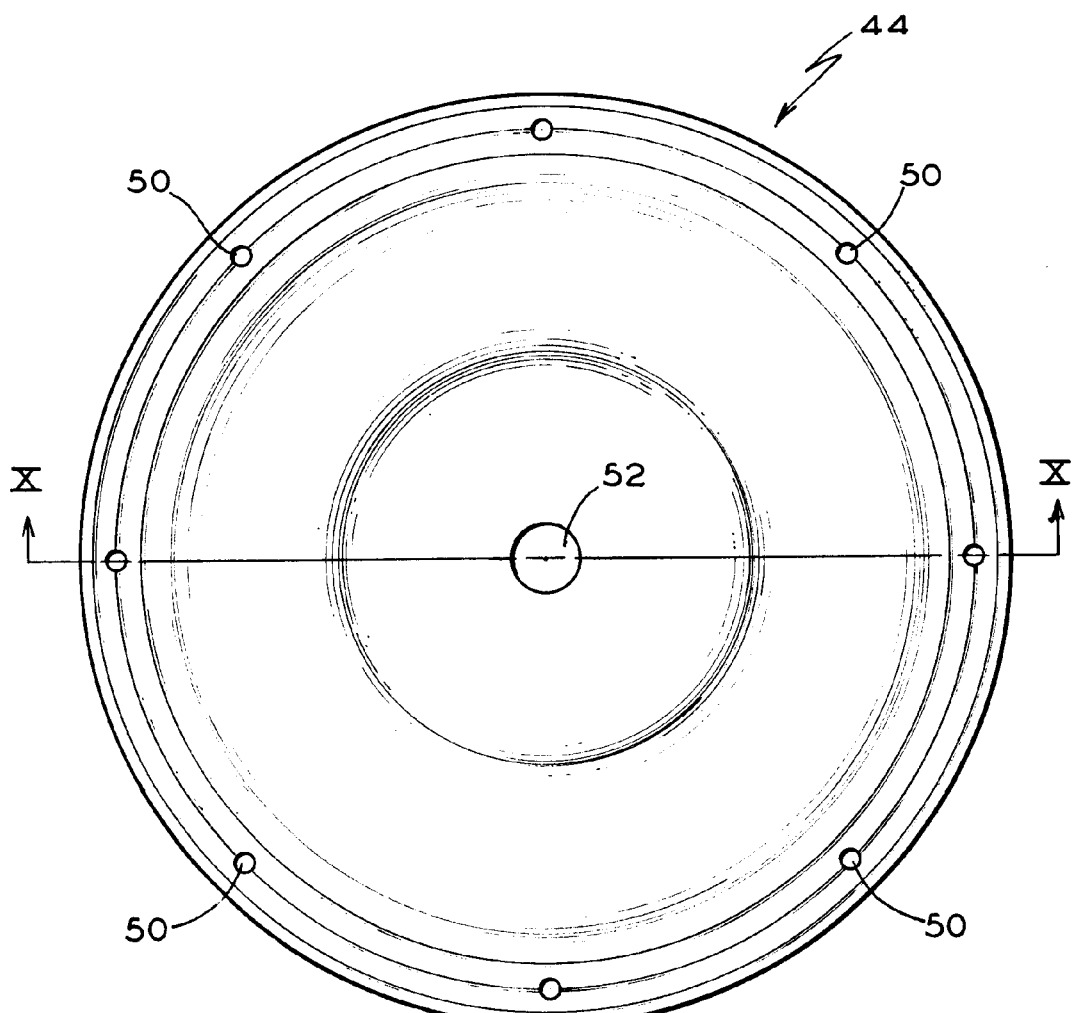
FIG. 9 is a plan view of the embodiment shown in FIG. 8.
Figure 10:
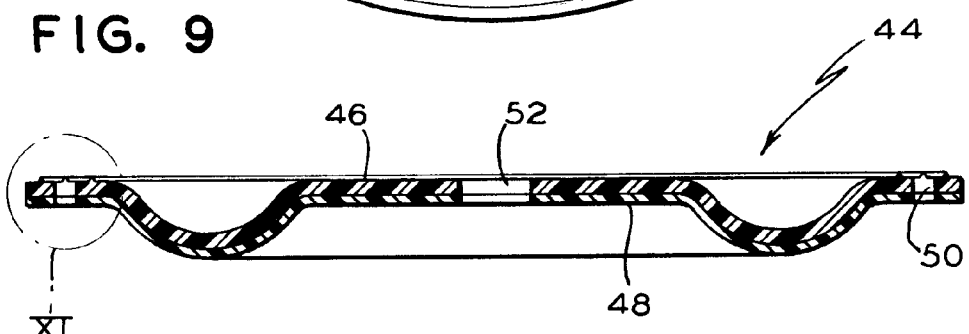
FIG. 10 is a cross sectional view of the embodiment shown in FIG. 8 taken along the line X—X in FIG. 9.
Figure 11:
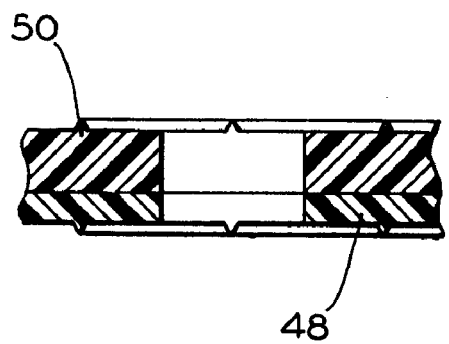
FIG. 11 is an enlarged view of the embodiment shown in FIG. 10 as indicated by XI in FIG. 10.

As shown in FIGS. 9 through 11, the pump diaphragm 44 can be provided with the typical peripheral fastener holes 50 and central fastener hole 52. As shown best in FIG. 11, the upper layer 46 of Sarlink™ can be about twice the thickness of the lower, chemically resistant Arnitel™ layer 48. The upper layer 46 can provide the primary diaphragm material having the necessary tensile strength, thermal stability, elasticity and fatigue resistance. The lower layer 48 may need only be a thin layer of material in order to protect the upper layer 46 from chemical materials. A presently preferred embodiment of a multilayer diaphragm 44 can, for example, have an overall diameter of 7.75 inches with a 0.085 inch layer of Sarlink™ bonded to a 0.040 inch layer of Arnitel™.

According to the presently preferred process, the two layer diaphragm 44 can be produced in a two step injection molding operation. Basically, the chemically resistant Arnitel™ layer 48 can be produced in a first injection molding step and then permitted to harden. Afterwards it can be painted with the Chemlok™ adhesive and hardener which is used to bond the chemically resistant Arnitel™ layer 48 to the resilient Sarlink™ layer 46. The second step of the injection molding process can include placing the cooled and adhesive painted chemically resistant Arnitel™ layer 48 back in the same front mold half, but utilizing a second back mold half which provides a larger mold cavity account for the injection of the additional Sarlink™ material to form the second layer 46 of the diaphragm. The Sarlink™ is injected onto the adhesive painted side of the chemically resistant Arnitel™ layer 48. The adhesive can be designed to be dry to the touch at room temperature and activated by the heat of the molten polymer as it is injected against the adhesive coating on the chemically resistant layer 48. The molding temperature is about 380° F. After the second layer 46 is adhered to the chemically resistant layer 48 and is permitted to harden, the diaphragm is essentially complete except for finishing and drilling the necessary fastener holes.

Thus, according to this process a two part pump diaphragm 44 can be mass produced by injection molding techniques and which has a chemically resistant layer. This process can be simpler, more efficient and less expensive than producing either a fabric reinforced rubber diaphragm of an injection molded polymer diaphragm and then having to bond a Teflon shield to either of those two diaphragms to provide the desired resistance and protection from chemicals.

The prior art fabric reinforced rubber diaphragm joined to a Teflon™ shield shown in FIG. 4 can require three separate processes. First, a fabric reinforced rubber diaphragm must be produced, such as by a conventional process. Second, the Teflon™ shield must be produced, also such as by a conventional process. Finally, the fabric reinforce rubber diaphragm 14 must be bolted into the chamber of a pump against the Teflon™ shield 26. According to another prior art process, as described in connection with the diaphragm shown in FIG. 3A, the fabric reinforced rubber diaphragm 14 is attached to the Teflon™ 25 shield by first painting the shield 25 with an adhesive and then placing it in a press with the fabric reinforced rubber diaphragm 14. The rubber diaphragm 14, which can be un-vulcanized at this stage, can be compressed against the Teflon™ shield 25 under elevated pressures and temperatures. The fabric reinforced rubber diaphragm can be cured and simultaneously bonded to the Teflon™ shield 25 during this process.

In the case where an injection molded polymer diaphragm 35, such as shown in FIGS. 5 through 7, is employed and chemical protection is required, a Teflon™ shield 41 can be joined to the polymer diaphragm 35 in the manner described in connection with FIG. 7A.

Consequently, as can be understood, the previously described prior art processes of providing a Teflon™ shield over either a fabric reinforced rubber diaphragm 14 or an injection molded polymer diaphragm 35 can be more complex and more expensive than the heretofore described processes according to the invention for making an entirely injection molded multiple layer pump diaphragm 44 having one of the layers formed of a chemically resistant layer 48, such as Arnitel™.

Although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A method for making an injection molded multi-polymer pump diaphragm having one side resistant to chemicals, said method comprising the steps of:

a. injecting molten polymer material of a first type having chemical resistance properties into a first pump diaphragm mold cavity to produce a first pump diaphragm layer;

b. curing said first pump diaphragm layer;

c. applying an adhesive to a side of said first pump diaphragm layer;

d. placing said first pump diaphragm layer in a second pump diaphragm mold cavity sized to receive an amount of a second type of polymer material against said side of said first pump diaphragm layer having said adhesive applied thereto;

e. injecting molten polymer material of said second type into said second pump diaphragm mold cavity into contact with said adhesive to produce a second pump diaphragm layer adhered to said first pump diaphragm layer;

f. curing said second pump diaphragm layer such that said first and second pump diaphragm layers adhere together to form a pump diaphragm having one side which is resistant to chemicals; and g. wherein said first type of polymer material has a first melt temperature and said second type of polymer has a second melt temperature less than said first melt temperature.

* * * * *